(12) United States Patent
Merassi et al.

(10) Patent No.: US 7,793,544 B2
(45) Date of Patent: Sep. 14, 2010

(54) MICROELECTROMECHANICAL INERTIAL SENSOR, IN PARTICULAR FOR FREE-FALL DETECTION APPLICATIONS

(75) Inventors: Angelo Merassi, Vigevano (IT); Sarah Zerbini, Cornaredo (IT); Ernesto Lasalandra, S. Donato Milanese (IT); Benedetto Vigna, Pietrapertosa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 405 days.

(21) Appl. No.: 11/777,702

(22) Filed: Jul. 13, 2007

(65) Prior Publication Data

US 2008/0011080 A1      Jan. 17, 2008

(30) Foreign Application Priority Data

Jul. 14, 2006    (EP)    .................................. 06425485

(51) Int. Cl.
*G01P 15/08* (2006.01)
(52) U.S. Cl. .................... 73/514.32; 360/75; 73/514.01
(58) Field of Classification Search .................. 73/510, 73/514.01, 514.32; 340/669; 360/75
See application file for complete search history.

(56) References Cited

U.S. PATENT DOCUMENTS 5,982,573 A * 11/1999 Henze .......................... 360/75
7,450,332 B2 * 11/2008 Pasolini et al. ................. 360/75
2002/0027191 A1    3/2002 Min et al.
2005/0274184 A1   12/2005 Zerbini et al.

FOREIGN PATENT DOCUMENTS

| EP | 1174871 A1 | 1/2002 |
|----|------------|--------|
| EP | 1519197 A1 | 3/2005 |
| EP | 1 640 726 A1 | 3/2006 |

* cited by examiner

*Primary Examiner*—John E Chapman
(74) *Attorney, Agent, or Firm*—Lisa K. Jorgenson; Timothy L. Boller; Seed IP Law Group PLLC

(57) ABSTRACT

An inertial sensor provided with a detection structure sensitive to a first, a second and a third component of acceleration along respective directions of detection, and generating respective electrical quantities as a function of said components of acceleration. The detection structure supplies at output a resultant electrical quantity obtained as combination of said electrical quantities, and correlated to the value of a resultant acceleration acting on the inertial sensor, given by a vector sum of the components of acceleration. In particular, the detection structure is of a microelectromechanical type, and comprises a mobile portion made of semiconductor material forming with a fixed portion a first, a second and a third detection capacitor, and an electrical-interconnection portion, connecting the detection capacitors in parallel; the resultant electrical quantity being the capacitance obtained from said connection in parallel.

23 Claims, 2 Drawing Sheets

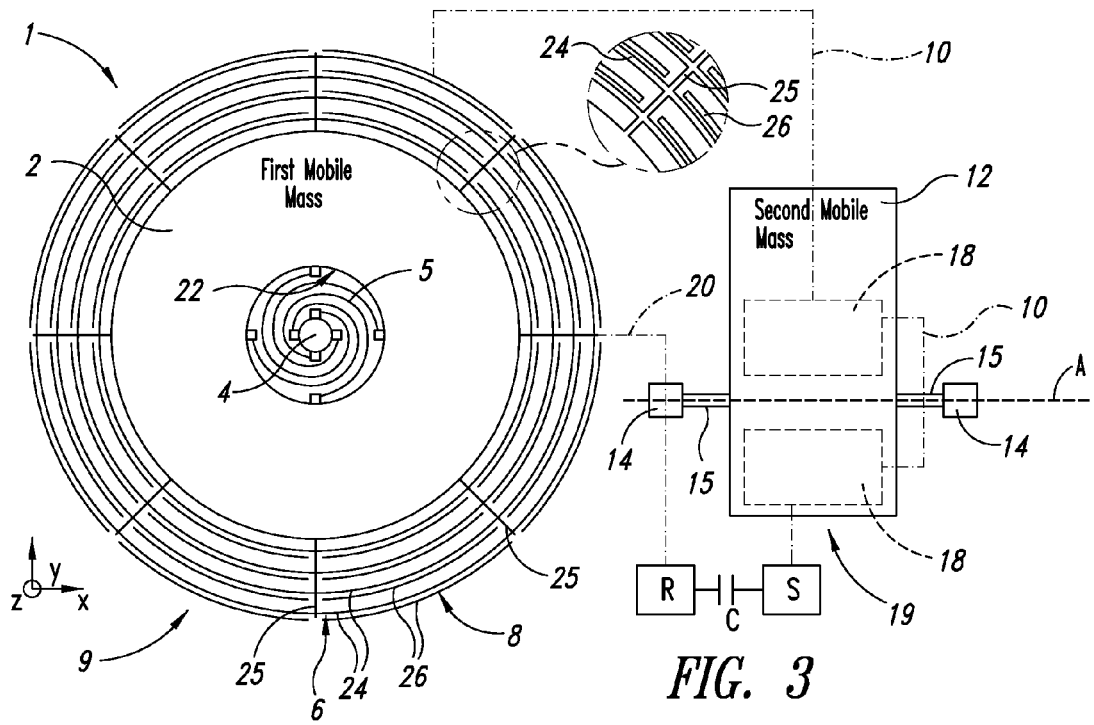
FIG. 3
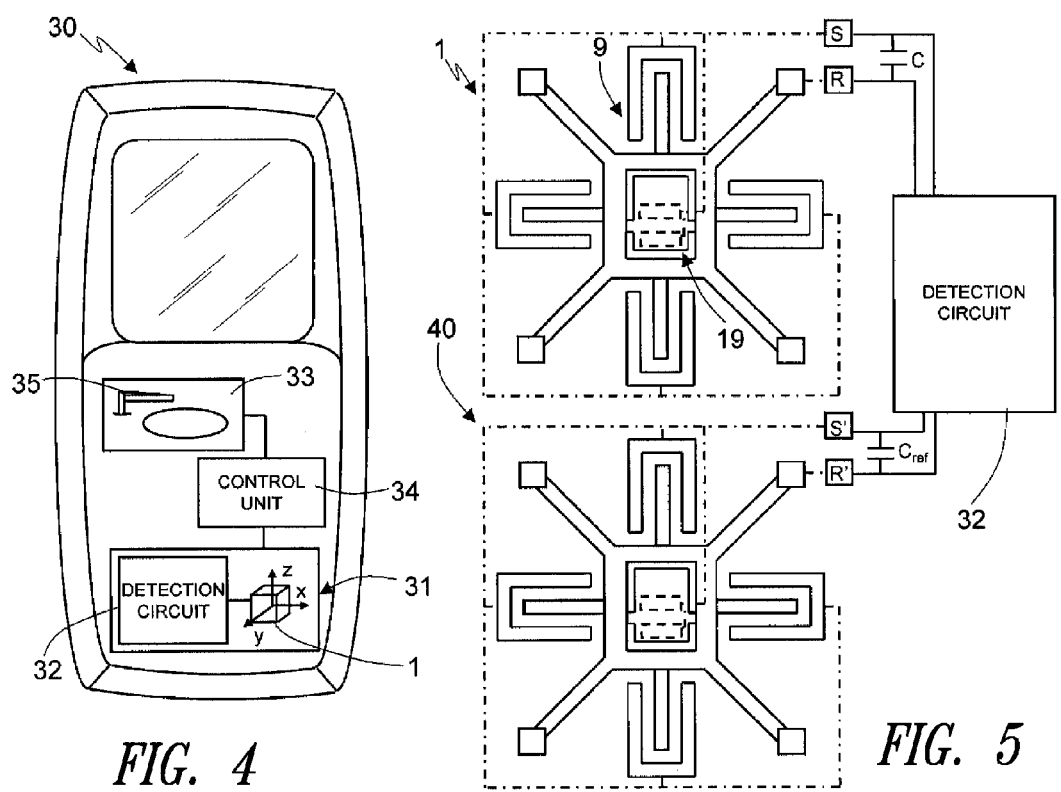
FIG. 4
FIG. 5

MICROELECTROMECHANICAL INERTIAL SENSOR, IN PARTICULAR FOR FREE-FALL DETECTION APPLICATIONS

BACKGROUND OF THE INVENTION

1. Field of the Invention

The present invention relates to a microelectromechanical inertial sensor, in particular for free-fall detection applications, to which the following treatment will make explicit reference without this implying any loss in generality.

2. Description of the Related Art

As is known, there is an increasingly widespread use, in portable devices, such as for example laptops, PDAs (Personal Data Assistants), digital audio players, cell phones, digital camcorders, portable computers and the like, of hard-disk (HD) units for storage of data. In fact, hard disks have a high storage capacity, a high access speed, and a low cost.

However, hard disks may suffer damage when used in portable applications. In fact, portable apparatuses are very liable to violent impact, in particular when they fall to the ground during their normal use. The impact of the portable apparatus against the ground has harmful repercussions on the hard disk inside it, producing in the worst case permanent damage and consequent loss of the stored data. Hard disks are particularly susceptible to impact, in so far as a read/write head is normally kept at a small distance from a corresponding data-storage medium. Consequently, due to the impact, the read/write head hits the storage medium and can get damaged together with it.

In order to prevent, or at least limit, onset of said destructive events, it has been proposed to use free-fall detection devices coupled to the hard-disk unit. In particular, free-fall detection devices comprise an inertial sensor made with microfabrication techniques (of a MEMS type), adapted to detect accelerations acting on the portable apparatus, and a free-fall detection circuit, adapted to identify the free-fall event on the basis of the detected accelerations. When free-fall is detected, an appropriate interrupt signal is issued to a control device of the hard disk, which, in turn, issues a command for forced "parking" of the read/write head in a safe area, coinciding, for example, with the position assumed with the apparatus turned off.

In a known manner, inertial sensors of a MEMS type comprise suspended structures of semiconductor material, which are fixed to a substrate at one or more anchorage points and are movable along one or more axes of detection. In particular, the suspended structures form one or more mobile masses (referred to in general as rotors), which undergo displacements with respect to the substrate in the presence of external accelerations. Rotor electrodes are associated to the mobile masses and stator electrodes face the rotor electrodes and are fixed with respect to the substrate; the stator and rotor electrodes form detection capacitors, the capacitance of which varies with the displacement of the mobile mass. A suitable interface electronics is able to detect, on the basis of the variation of this capacitance, the amount of displacement of the mobile mass, and so the acceleration acting on the portable apparatus. In particular, the displacement of the mobile mass occurs also in the presence of a static acceleration (for example, the acceleration of gravity), generating a corresponding capacitive unbalancing, which is detected by the interface electronics. It follows that, even in a rest condition, a non-zero acceleration is detected.

Instead, during free fall, the displacement of the mobile mass with respect to a reference system fixed with respect to the substrate, which is also undergoing free fall, is zero (the rotor electrodes remain centered with respect to the corresponding stator electrodes), and the detected acceleration is zero (or substantially zero if air friction is considered). Accordingly, the free-fall detection circuit identifies a condition in which the overall acceleration acting on the portable apparatus (in practice, the vector sum of the components of acceleration acting along three Cartesian axes x, y, z fixed with respect to the portable apparatus, detected individually by a triaxial accelerometer) is lower than a certain threshold, close to zero:

$$a = \sqrt{a_x^2 + a_y^2 + a_z^2} \leq Th$$

where a is the amplitude of the acceleration acting on the portable apparatus, given by the vector sum of the components of acceleration $a_x$, $a_y$ and $a_z$ acting along the axes x, y and z, respectively, and Th is the acceleration threshold, having a value close to zero. The presence of a triaxial accelerometer is required for detecting the free-fall event irrespective of the orientation of the portable apparatus during the free-fall motion.

The operations described (in particular the calculation of the vector sum of the individual components of acceleration) are rather laborious to carry out and render the free-fall detection circuit complex. On the other hand, the tendency is known towards a decrease in size of hard disks, in particular in the field of portable apparatuses, in which size miniaturization has a fundamental importance.

Therefore, the need is felt for a simplification of the free-fall detection electronics, not only to obtain a reduction in the manufacturing costs, but above all to reduce the occupation of area.

BRIEF SUMMARY OF THE INVENTION

One embodiment of the present invention provides a microelectromechanical inertial sensor, in particular an accelerometer, and a corresponding free-fall detection device which enables the aforesaid disadvantages to be overcome and is an improvement of known devices.

According to one embodiment of the present invention, a microelectromechanical inertial sensor and a free-fall detection device are consequently provided, as described herein.

BRIEF DESCRIPTION OF THE SEVERAL VIEWS OF THE DRAWINGS

For a better understanding of embodiments of the present invention, preferred embodiments thereof are now described, purely by way of non-limiting example and with reference to the attached plate of drawings, wherein:

FIG. 3 is a schematic plan view of an inertial sensor according to a third embodiment of the invention;

FIG. 4 is a schematic view of a portable apparatus provided with a free-fall detection device, according to an aspect of the present invention; and FIG. 5 shows a schematic plan view of an inertial sensor according to a fourth embodiment of the invention, and the corresponding detection device.

DETAILED DESCRIPTION OF THE INVENTION

As will be clarified hereinafter, according to an embodiment of the present invention an inertial sensor is provided with a detection structure configured to be sensitive to accelerations acting along at least two axes of detection (preferably along three axes of detection, orthogonal to one another), and to supply directly at output an electrical quantity (in particular a capacitance variation) correlated to the vector sum of the accelerations.

Figure 1:
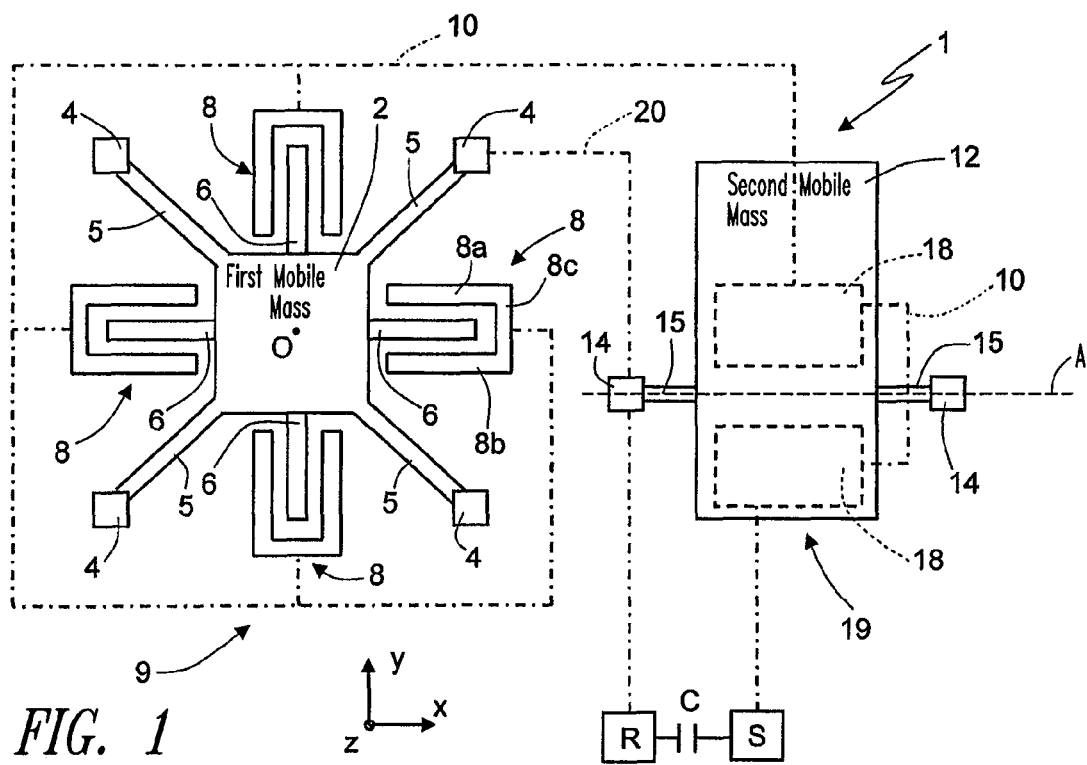
FIG. 1 is a schematic plan view of a microelectromechanical inertial sensor according to a first embodiment of the invention.

In detail, and with reference to FIG. 1, an inertial sensor 1 comprises a first mobile mass 2, having in plan view a generically polygonal shape, for example a square shape, and made of electrically conductive material, for example silicon. The first mobile mass 2 is produced using techniques of microfabrication of a structural layer (for example an epitaxial layer) so as to be suspended over a substrate of semiconductor material (not illustrated), and is anchored to the substrate by means of first anchorages 4. The first mobile mass 2 is connected to the first anchorages 4 by means of first elastic elements 5, configured to enable a displacement thereof (in particular a translation thereof) along a first axis of detection x and a second axis of detection y, orthogonal to one another, belonging to a plane xy of horizontal extension of the first mobile mass 2. In particular, four first elastic elements 5 extend from the four edges of the first mobile mass 2, in the direction of the diagonals of the aforesaid square, and are connected to four respective first anchorages 4. The width of the first elastic elements 5 is smaller (in particular much smaller) than a thickness of the first mobile mass 2 along a third axis of detection z, vertical and orthogonal to the first and second axes of detection x, y so as to form therewith a set of three Cartesian axes. The first elastic elements 5 are thus compliant for the movement of the first mobile mass 2 in the plane xy, and rigid for its movement outside the same plane, along the third axis of detection z. In addition, the first elastic elements 5, as also the first anchorages 4, are electrically conductive.

The first mobile mass 2 carries mobile electrodes 6, having an elongated shape, for example rectangular, which extend outwards starting from its peripheral sides, approximately from a central point thereof, between two respective first elastic elements 5. In particular, four mobile electrodes 6 are present, aligned in twos with respect to one another, and along the first axis of detection x or the second axis of detection y.

Associated to each mobile electrode 6 is a corresponding first fixed electrode 8, anchored and fixed to the substrate. In particular, the first fixed electrodes 8 are U-shaped with a first arm 8a and a second arm 8b facing and parallel to opposite faces of a corresponding mobile electrode 6, and with a connecting portion 8c, connecting the first and second arms 8a, 8b to one another. Each mobile electrode 6 forms with the first and second arms 8a, 8b of the corresponding first fixed electrode 8 the plates of a first and a second elementary capacitor, the capacitance of which varies in a known way as a function of the gap between the plates. The first and second elementary capacitors are connected in parallel by the connecting portion 8c. As will be described in detail hereinafter, the displacement of the first mobile mass 2 along the first axis of detection x or the second axis of detection y causes a variation in the gap between the plates of the above capacitors and a corresponding capacitive unbalancing.

Basically, the first mobile mass 2 forms with the corresponding mobile and fixed electrodes 6, 8 a first detection structure 9 in the plane xy, designed for detection of accelerations acting along the first and the second axis of detection x, y. As is evident from FIG. 1, the first detection structure 9 is symmetrical with respect to a central point O located at the centre of the first mobile mass 2.

First electrical interconnections 10, which are illustrated schematically and are formed in a known manner that is not described in detail (for example, by machining an electrode layer underlying the structure of the first mobile mass 2), electrically connect the first fixed electrodes 8 to one another, in particular the corresponding connecting portions 8c. In this way, the various elementary capacitors are all connected to one another in parallel. In particular, the parallel electrical connection of the elementary capacitors formed by the electrodes which are aligned in the second direction of detection y forms a first detection capacitor for detection of accelerations directed along the first axis x, while the parallel electrical connection of the capacitors formed by the electrodes which are aligned in the first direction of detection x forms a second detection capacitor for detection of accelerations that are directed along the second axis y.

The inertial sensor 1 further comprises a second mobile mass 12, which has in plan view, for example, a rectangular shape extending along the second axis y, and is made of electrically conductive material, for example silicon. Also the second mobile mass 12 is suspended over the substrate, to which it is anchored by means of second anchorages 14, which are electrically conductive. The second mobile mass 12 is connected to the second anchorages 14 by means of second elastic elements 15, which are also conductive, aligned to one another along an axis of inclination A, parallel to the first axis of detection x, and extend laterally on opposite sides of the second mobile mass 12. The second elastic elements 15 are configured to enable a displacement of the second mobile mass 12 outside the plane xy in the vertical direction, in particular a tilting thereof around the axis of inclination A, while they are rigid for displacements in the plane xy.

Two second fixed electrodes 18 are arranged underneath the plane of the second mobile mass 12, facing the second mobile mass 12 on opposite sides with respect to the axis of inclination A, and have in plan view a rectangular shape. The second fixed electrodes 18 form with the second mobile mass a respective first elementary capacitor and a respective second elementary capacitor, the capacitance of which varies as the distance between the plates varies, and so as a function of the tilting of the second mobile mass 12.

Basically, the second mobile mass 12 forms with the corresponding mobile and fixed electrodes a second detection structure 19, which is to detect an acceleration acting along the third axis of detection z.

The first electrical interconnections 10 electrically connect the second fixed electrodes 18 to one another, thus forming a third detection capacitor for accelerations directed along the third axis of detection z (given by the parallel of the respective first and second elementary capacitors); in addition, the first electrical interconnections 10 connect the second fixed electrodes 18 to the first fixed electrodes 8 and are connected to a stator contact pad S.

Second electrical interconnections 20 connect the first anchorages 4 to the second anchorages 14 and are connected to a rotor contact pad R.

Consequently, the detection capacitors formed by the first and second detection structures 9, 19 are all connected in parallel to one another, to form a single overall detection capacitor having a capacitance C (shown schematically) between the rotor and stator contact pads R, S.

In use, a component of acceleration $a_x$, $a_y$ directed along the first or the second axis of detection x, y causes a mobile electrode 6 to approach one between the first and the second arm 8a, 8b of the corresponding first fixed electrode 8 (according to the direction of the acceleration), and correspondingly to move away from the other of the two arms 8a, 8b. The approach entails an increase in the capacitance of a first elementary capacitor, while the moving away entails a decrease in the capacitance of the second elementary capacitor. In a known way, the variation in capacitance of a capacitor with plane and parallel plates has a non-linear evolution (in particular a hyperbolic evolution) as a function of the distance between the plates. The increase in capacitance of the first elementary capacitor due to approach of the plates is greater than the decrease in capacitance of the second elementary capacitor due to moving away of the corresponding plates. The capacitance of the first/second detection capacitors, resulting from the parallel electrical connection of the elementary capacitors, undergoes an increase with respect to a situation of rest, whatever the direction of the acceleration, and is proportional to the respective component of acceleration. This behavior applies in particular for large displacements, in the case, that is, where the displacement of the mobile electrode 6 is comparable with the distance at rest between the mobile electrode and the fixed electrode 8 (a condition that is valid in the free-fall detection application). In this condition, the decrease in capacitance of the second elementary capacitor is much lower than the increase in capacitance of the first elementary capacitor. An altogether similar argument applies to the second detection structure 19, in the case of accelerations acting along the third axis of detection z, with the difference that in this case it is the second mobile mass 12 that itself acts as mobile electrode, the distance of which from the second fixed electrodes 18 varies according to its tilting. Also in this case, the increase in a first elementary capacitor is preponderant with respect to the decrease in the second elementary capacitor, so that in any case a net increase in the capacitance of the third detection capacitor occurs, which is proportional to the component of acceleration $a_z$ along the third axis of detection z.

Due to the parallel connection of the detection capacitors, the capacitance C of the overall detection capacitor between the rotor and stator contact pads R, S undergoes an increase equal to the sum of the increases of the individual detection capacitors related to the individual components of acceleration $a_x$, $a_y$ and $a_z$. The capacitance C is consequently increasing, and the amount of its variation is correlated to the value of the resultant acceleration acting on the inertial sensor 1, given by the vector sum of the components of acceleration $a_x$, $a_y$ and $a_z$, whatever the direction and sense of the acceleration.

Figure 2:
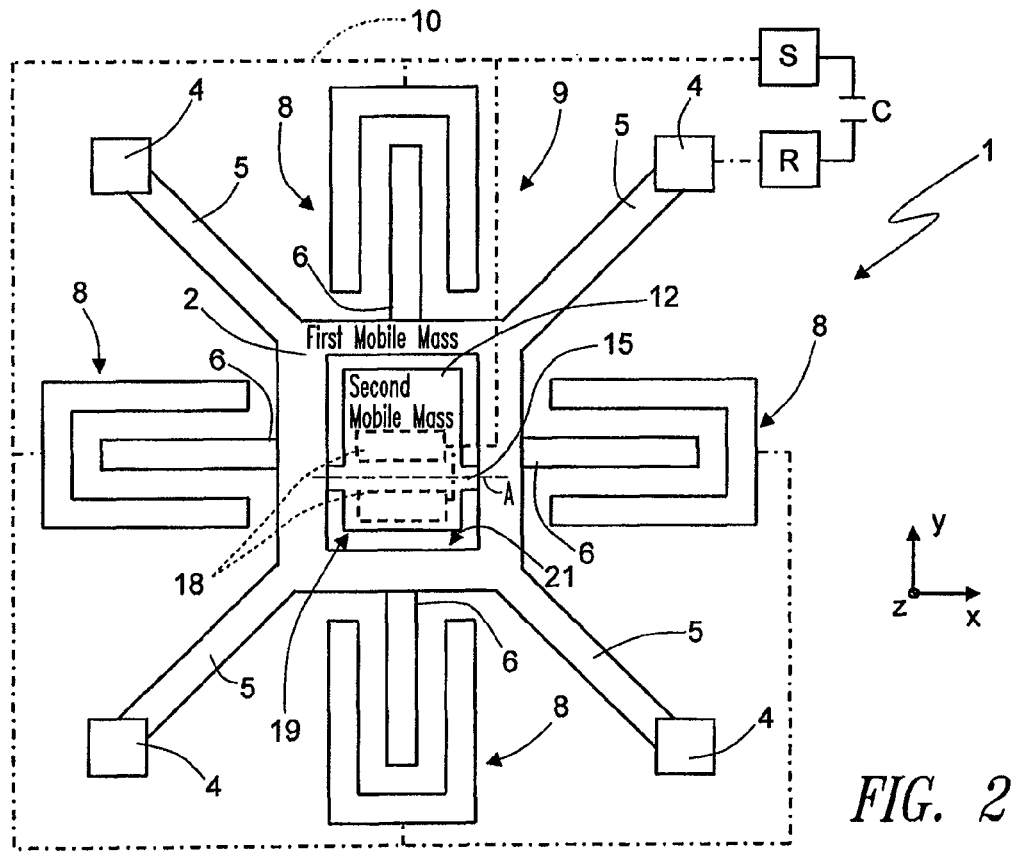
FIG. 2 is a schematic plan view of an inertial sensor in accordance with a second embodiment of the invention.

FIG. 2 shows a second embodiment of the inertial sensor 1, which is advantageous in that it enables a reduction of a corresponding area occupation.

In detail, unlike what has been described previously, the first mobile mass 2 is hollow, frame shaped, and defines inside it a window 21. The second mobile mass 12 is housed inside the window 21, and the second elastic elements 15 are fixed to internal sides of the frame (in this case the second anchorages 14, as likewise the second electrical interconnections 20, are not present). The remaining part of the detection structure is not modified, and in particular the configuration and arrangement of the mobile electrodes 6 and of the first and second fixed electrodes 8, 18, as likewise their interconnections, which enable automatic detection of the vector sum of the components of acceleration $a_x$, $a_y$ and $a_z$, is not changed.

A third embodiment of the inertial sensor 1 envisages a different configuration of the first detection structure 9 sensitive to accelerations in the plane xy, in particular substantially similar to what is described in US Publication No. 2005/0274184 A1 filed on Sep. 23, 2004 in the name of the present applicant, relating to a planar inertial sensor.

In detail (FIG. 3), the first mobile mass 2 has in plan view a circular shape and is connected to the substrate by means of just one first anchorage 4, set centrally. The first mobile mass 2 has a central hole 22 delimiting an internal circumference thereof. The first anchorage 4 extends inside the central hole 22 and is connected to the internal circumference by the first elastic elements 5, which have in this case the shape of an isotropic spiral, having a reduced width so as to enable displacements of the first mobile mass 2 in any planar direction. The mobile electrodes 6 are formed by a plurality of rings 24, concentric with respect to one another and to the first mobile mass 2, and fixed to the first mobile mass 2 by means of rigid arms 25 that extend radially outwards from the first mobile mass 2. The fixed electrodes 8 are made of a plurality of arched portions 26, forming arcs of circumference externally facing the rings 24, and arranged each between a pair of adjacent rigid arms 25.

The second detection structure 19 is not modified with respect to the first embodiment. In particular, the first electrical interconnections 10 connect the various arched portions 26 to one another (in a way not illustrated) and to the second fixed electrodes 18, while the second electrical interconnections 20 connect the first and second anchorages 4, 14.

As described in detail in the aforesaid document, the first mobile mass 2 is sensitive to accelerations acting along any direction of the plane xy, and, as it moves in this direction, the distance of separation between the rings 24 and the arched portions 26 varies. The capacitive variation is also in this case increasing and directly proportional to the acceleration acting on the inertial sensor in any direction lying in the plane xy (in this case, consequently, only one capacitor for detection of accelerations in the plane xy is present, in so far as the sensor does not detect in this case the components of acceleration, but directly the acceleration vector in the plane xy). In use, this capacitive variation adds, as previously illustrated, to the capacitive variation of the third detection capacitor due to the vertical acceleration along the third axis of detection z so that also in this case the capacitance of the overall detection capacitor C between the electrical-contact pads R and S is proportionally related to the vector sum of the components of acceleration acting on the sensor.

The inertial sensor previously described has the following advantages.

In the first place, it enables considerable simplification of a corresponding reading electronic interface. In fact, from the standpoint of the interface, the inertial sensor 1 can be represented as a whole as a single capacitor with capacitance varying as a function of the resultant acceleration acting on the sensor, the capacitor having one terminal connected to the mobile electrodes and the other terminal to the fixed electrodes. Basically, the vector sum of the acceleration signals along the three axes of detection x, y, z is directly performed by the microelectromechanical detection structure. It is thus sufficient to detect the variation of capacitance of this capacitor with respect to a situation at rest, in order to derive the value of the acceleration. The reduction in complexity of the read electronics is evident, in so far as it does not need to comprise a stage for calculation of the vector sum of components of acceleration detected along different axes of detection. Thanks to this simplification, it is possible to obtain a saving of area occupation of the read electronic interface that can even reach 50%.

These characteristics are particularly advantageous when the inertial sensor 1 is used for identifying a free-fall condition of a portable apparatus. In particular, as shown in FIG. 4, a portable apparatus 30, in this case a cell phone, comprises for this purpose a free-fall detection device 31 incorporating the inertial sensor 1 and provided with a detection circuit 32. The portable device 30 further comprises a hard-disk storage unit 33 and a control unit 34, for example provided with a microprocessor, which is designed to supervise operation of the portable device 30 and in particular of the hard-disk storage unit 33, and is connected to the free-fall detection device 31. In particular, the detection circuit 32 is configured to produce an electrical signal (for example a voltage signal), correlated to the acceleration acting on the portable device, on the basis of the capacitive variation detected by the inertial sensor 1, and to compare this electrical signal with a detection threshold Th. If the electrical signal drops below the detection threshold Th, the detection circuit 32 identifies the free-fall condition and issues an interrupt signal, which is received by the control unit 34. The control unit 34 then sends a series of orders to the hard-disk storage unit 33 so as to protect it from the fall; for example, it issues a command for forced "parking" of a corresponding read/write head 35 into a safe area. Clearly, the control unit 34 can carry out further operations for safeguarding other components of the portable device 30.

Finally, it is clear that modifications and variations can be made to what is described and illustrated herein, without thereby departing from the scope of the present invention, as defined in the appended claims.

In particular (FIG. 5), in each of the embodiments described (FIG. 5 refers, by way of example, to the second embodiment), the inertial sensor 1 can comprise a reference structure 40 substantially identical to the detection structure described previously, but having the "mobile" elements (the first and second mobile masses 2, 12 and the mobile electrodes 6) that are fixed with respect to the substrate and hence do not move as a function of the acceleration. For example, the reference structure 40 can comprise elastic elements that are rigid in all directions so as to hinder any displacement (and consequent capacitive variation) due to the acceleration. The reference structure 40 acts in fact as reference for a differential reading of the capacitive signal, for compensating for any possible variations of capacitance due to external factors other than the acceleration (for example, thermomechanical stresses). The reference structure 40 supplies a total value of capacitance $C_{ref}$ (between respective rotor and stator contact pads R', S') independent of the acceleration, and affected only by the aforesaid external factors. This value of capacitance can be subtracted from the capacitance of the overall detection capacitor C in order to eliminate the influence of the external factors on the detection of acceleration. Computing the difference $\Delta c$ between the detection capacitance and the reference capacitance $$\Delta C = \frac{\varepsilon_0 \cdot A}{d-s} + \frac{\varepsilon_0 \cdot A}{d+s} - \frac{2 \cdot \varepsilon_0 \cdot A}{d}$$

(where the first two terms are the two elementary capacitances in parallel, which respectively increase and decrease as a function of the acceleration, and the third term is the reference capacitance; $\varepsilon_0$ is the vacuum dielectric constant; s is the displacement of the mobile mass along the first axis of detection x; d is the distance at rest between the mobile and fixed electrodes; and A is the facing area between the rotor and stator electrodes), it may be readily shown that the differential capacitive variation of the inertial sensor (in the case of an acceleration acting along the first axis of detection x), obtained by the detection circuit 32, is given by:

$$\Delta C = 2 \cdot C_0 \cdot \frac{s^2}{d^2 - s^2}$$

where $C_0$ is the value of capacitance at rest (in the absence of acceleration).

In addition, the inertial sensor 1 can be used also in other applications different from free-fall detection, for example for re-activating a portable apparatus from a stand-by condition. In this case, the electrical value generated, related to the total acceleration, is compared with an activation threshold, and, if the activation threshold is exceeded, the procedures for re-activation of the apparatus from stand-by are initiated. More in general, the sensor described can be applied in the case where the comparison of the acceleration value with a threshold value is required.

The inertial sensor could comprise just one mobile mass (in particular the first mobile mass 2), with the first elastic elements 5 also enabling a freedom of movement (for example of translation) in the vertical direction, along the third axis of detection z. The detection of the vertical acceleration could in this case be performed as a function of the capacitive variation of elementary capacitors formed by the first mobile mass and by a first and a second electrode facing the first mobile mass on opposite sides along the third axis of detection z (in particular one set above and the other underneath the plane of the mobile mass).

Furthermore, it is evident that the shape of the components of the detection structure (mobile masses and electrodes) can differ from the ones illustrated. For example, the first mobile mass 2 can have an elliptical or polygonal shape, instead of a circular one (in the case of the second embodiment), or else rectangular, instead of square (in the case of the first embodiment). Also, the number of the mobile and fixed electrodes could differ from what is illustrated. For example, in the first embodiment, only two mobile electrodes 6 and two fixed electrodes 8 could be present, at the expense of the symmetry of the detection structure.

Finally, the inertial sensor 1 could detect the components of acceleration along just two axes of detection (for example x and z, or else x and y) in the case where the orientation of the portable apparatus 30 during the free fall were known a priori.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. An inertial sensor comprising:
   a detection structure of a microelectromechanical type, comprising:
   a first mobile portion configured to be responsive to an in-plane component of acceleration, being the acceleration vector acting in a plane of horizontal extension of said first mobile portion, and to form with at least one first fixed portion facing said first mobile portion at least one in-plane detection capacitor configured to generate an in-plane capacitance variation as a function of said in-plane component of acceleration;
   a second mobile portion configured to be responsive to an out-of-plane component of acceleration along an orthogonal direction of detection orthogonal to said plane and to form with at least one second fixed portion facing said second mobile portion at least one out-of-plane detection capacitor configured to generate an out-of-plane capacitance variation as a function of said out-of-plane component of acceleration; and
   an electrical-interconnection portion configured to electrically couple in parallel said in-plane and out-of-plane detection capacitors and to supply at output a total capacitance obtained from a combination of said in-plane and out-of-plane capacitances and correlated to a value of a resultant acceleration acting on said inertial sensor, given by a vector sum of said in plane and out-of-plane components of acceleration.

2. The inertial sensor according to claim 1, wherein said detection structure is configured such that said in-plane capacitance increases with respect to a situation at rest, irrespective of a direction of said in-plane component of acceleration.

3. The inertial sensor according to claim 1 wherein:
the first mobile portion is free to move along first and second directions of detection in plane in response to first and second in-plane components of acceleration;
the at least one in-plane detection capacitor comprises first and second in-plane detection capacitors having capacitances that are respectively proportional to said first and second in-plane components of acceleration; and
the in-plane capacitance is a sum of a total capacitance of said first and second in-plane detection capacitors.

4. The inertial sensor according to claim 3, wherein said first mobile portion comprises a first mobile mass of semiconductor material, and mobile electrodes carried by said first mobile mass, said first mobile mass being fixed to first anchorages, fixed to a support, by first elastic elements configured to enable a displacement of said first mobile mass along said first and second in-plane directions of detection in response to said components of acceleration, and wherein said at least one first fixed portion comprises first fixed electrodes, each of the fixed electrodes facing a respective one of said mobile electrodes and forming with said mobile electrodes said first and second in-plane detection capacitors, and said electrical-interconnection portion comprises first electrical interconnections electrically connecting said first fixed electrodes to one another.

5. The inertial sensor according to claim 4, wherein said first fixed electrodes are U-shaped and comprise:
a first arm and a second arm facing opposite sides of a respective one of said mobile electrodes; and
a connecting portion connecting said first and second arms to one another wherein said mobile electrodes extend outwards starting from said first mobile mass and aligned with one of said first and second directions of detection, said first and second arms respectively forming with said mobile electrodes first and second elementary capacitors coupled in parallel, which contribute to the formation of one of said first and second in-plane detection capacitors, according to a direction of alignment of said respective mobile electrodes.

6. The inertial sensor according to claim 5, wherein a displacement of said first mobile mass causes an increase in capacitance of the first elementary capacitor and a decrease in capacitance of the second elementary capacitor, said increase being higher than said decrease such that one of said first and second in-plane detection capacitors has a net increase of capacitance following said displacement, regardless of the direction of said first and second in-plane components of acceleration.

7. The inertial sensor according to claim 3, wherein said first mobile portion comprises a first mobile mass of semiconductor material and mobile electrodes carried by said first mobile mass, said mobile electrodes being formed by a plurality of first regions arranged on concentric closed lines mutually coupled by radial-connection arms, said at least one first fixed portion comprises first fixed electrodes, each of the first fixed electrodes facing a respective one of said mobile electrodes and forming with said mobile electrodes one of said first and second in-plane detection capacitors, said first fixed electrodes being constituted by a plurality of second regions, which are also arranged on concentric closed lines, each of the plurality of second regions faces a respective first region between an adjacent pair of the radial-connection arms, and said electrical-interconnection portion comprises first electrical interconnections electrically connecting said first fixed electrodes to one another.

8. The inertial sensor according to claim 1, wherein said first mobile portion is fixed to first anchorages by first elastic elements and said second mobile portion is fixed to second anchorages by second elastic elements, the first and the second anchorages and the first and the second elastic elements being made of conductive material, and electrically coupled to one another.

9. The inertial sensor according to claim 8, wherein said first mobile portion has a frame-like shape and defines inside it an opening, said second mobile portion being housed inside said opening, and said second elastic elements fixing said second mobile mass to an inner perimeter of said opening.

10. The inertial sensor according to claim 1, further comprising a reference structure configured to be unresponsive to said in-plane component of acceleration and to supply a respective resultant electrical quantity independent of said resultant acceleration.

11. A detection device, comprising:
an inertial sensor having a detection structure of a microelectromechanical type, comprising:
a first mobile portion configured to be responsive to an in-plane component of acceleration, being the acceleration vector acting in a plane of horizontal extension of said first mobile portion, and to form with at least one first fixed portion facing said first mobile portion at least one in-plane detection capacitor for generating an in-plane capacitance variation as a function of said in-plane component of acceleration;
a second mobile portion configured to be responsive to an out-of-plane component of acceleration along an orthogonal direction of detection orthogonal to said plane and to form with at least one second fixed portion facing said second mobile portion at least one out-of-plane detection capacitor for generating an out-of-plane capacitance variation as a function of said out-of-plane component of acceleration; and
an electrical-interconnection portion configured to connect in parallel said in-plane and out-of-plane detection capacitors to generate total capacitance obtained from a combination of said in-plane and out-of-plane capacitances and correlated to a value of a resultant acceleration acting on said inertial sensor, given by a vector sum of said in-plane and out-of-plane components of acceleration; and
a detection circuit configured to receive said total capacitance from said inertial sensor and generate a corresponding electrical signal, compare said electrical signal with a threshold value, and identify a condition in which said electrical signal satisfies a given relationship with said threshold value.

12. The detection device of claim 11 wherein the detection structure is configured such that first and second electrical quantities undergo an increase with respect to a situation at rest, irrespective of a direction of the in-plane component of acceleration.

13. The detection device of claim 12 wherein:
the first mobile portion is free to move along first and second directions of detection in response to the in plane component of acceleration; and the at least one in-plane detection capacitor comprises first and a second in-plane detection capacitors having values of capacitances that are respectively proportional to the first and second in-plane components of acceleration.

14. An electronic apparatus comprising:
a detection device including an inertial sensor having a detection structure of a microelectromechanical type, comprising:
    a first mobile portion configured to be responsive to an in-plane component of acceleration, being the acceleration vector acting in a plane of horizontal extension of said first mobile portion, and to form with at least one first fixed portion facing said first mobile portion at least one in-plane detection capacitor for generating an in-plane capacitance variation as a function of said in-plane component of acceleration;
    a second mobile portion configured to be responsive to an out-of-plane component of acceleration along an orthogonal direction of detection orthogonal to said plane and to form with at least one second fixed portion facing said second mobile portion at least one out-of-plane detection capacitor for generating an out-of-plane capacitance variation as a function of said out-of-plane component of acceleration; and
    an electrical-interconnection portion configured to connect in parallel said in-plane and out-of-plane detection capacitors in order to generate and supply at output a total capacitance obtained from a combination of said in-plane and out-of-plane capacitances and correlated to a value of a resultant acceleration acting on said inertial sensor, given by a vector sum of said in-plane and out-of-plane components of acceleration; and
a detection circuit configured to receive said total capacitance from said inertial sensor and generate a corresponding electrical signal.

15. The apparatus according to claim 14, further comprising a hard-disk storage unit and a control unit coupled to said hard-disk storage unit and to said detection device, said control unit being configured to receive from said detection device a free-fall detection signal, and in response thereto control said hard-disk storage unit such that the hard-disk storage unit will assume a configuration of protection from said free fall.

16. The apparatus according to claim 14 wherein the electronic apparatus is of a portable type, chosen from the group consisting of: a cell phone, a portable computer, a PDA, a digital audio reproducer, and a digital camcorder.

17. A sensing device, comprising:
a first detection circuit operable to detect first and second acceleration components along respective first and second detection directions, and to generate first and second electrical quantities corresponding to the first and second acceleration components, respectively, wherein the first detection circuit comprises:
    a first mobile portion having freedom to move along the first and second detection directions in response to the first and second acceleration components, wherein the first mobile portion comprises a first mobile mass having mobile electrodes extending therefrom; and
    a first fixed portion facing the first mobile portion and forming therebetween a first and a second detection capacitor which respectively provides the first and second electrical quantities corresponding to the first and second acceleration components, respectively, wherein the first fixed portion comprises:
        first fixed electrodes respectively facing the mobile electrodes and forming therewith the first and second detection capacitors; and
        first electrical interconnections coupling the first fixed electrodes to one another in parallel;
a second detection circuit operable to detect a third acceleration component along a third detection direction, and to generate a third electrical quantity corresponding to the third acceleration component;
an electrical interconnection portion operable to couple the first detection circuit with the second detection circuit to allow the first and second detection circuits to output a resultant electrical quantity that is substantially equivalent to a sum of the first, second and third electrical quantities, the resultant electrical quantity corresponding to a value of a resultant acceleration acting on the sensing device, the value of the resultant acceleration given by a vector sum of the first, second and third acceleration components;
a support layer having first anchorages fixed thereto; and
first elastic elements coupling the first mobile mass to the first anchorages and operable to enable a displacement of the first mobile mass along the first and second detection directions in response to the first and second acceleration components.

18. The sensing device of claim 17 wherein the second detection circuit comprises:
    a second mobile portion having freedom to move along the third detection direction in response to the third acceleration component; and
    a second fixed portion facing the second mobile portion and forming therebetween a third detection capacitor which provides the third electrical quantity corresponding to the third acceleration component.

19. The sensing device of claim 18 wherein the second mobile portion comprises a second mobile mass having mobile electrodes extending therefrom.

20. The sensing device of claim 19, further comprising:
second anchorages fixed to the support layer; and
second elastic elements coupling the second mobile mass to the second anchorages and operable to enable a displacement of the second mobile mass along the third detection direction in response to the third acceleration component.

21. The sensing device of claim 20 wherein the second fixed portion comprises:
second fixed electrodes facing the second mobile mass from underneath the second mobile mass and forming therewith the third detection capacitor; and
second electrical interconnections coupling the first mobile mass to the second mobile mass such that the resultant electrical quantity corresponding to the value of the resultant acceleration acting on the sensing device is substantially equivalent to the sum of the capacitances of the first, second and third detection capacitors acceleration component.

22. An inertial sensor comprising:
a detection structure of a microelectromechanical type, configured to be responsive to at least a first and a second component of acceleration along a first and a second direction of detection, and to generate a first and a second electrical quantity as a function of said first and second components of acceleration, respectively, wherein said detection structure is further configured to output a resultant electrical quantity, the resultant electrical quantity being obtained from a combination of said first and second electrical quantities and correlated to a value of a resultant acceleration acting on said inertial sensor, the value of the resultant acceleration being given by a vector sum of said first and second components of acceleration, the detection structure comprising:

a mobile portion free to move along said first and second directions of detection in response to said first and second components of acceleration;

a fixed portion facing said mobile portion and forming therewith a first and a second detection capacitor having capacitances that are respectively proportional to said first and second components of acceleration; and an electrical-interconnection portion, configured to connect in parallel said first and second detection capacitors, said first and second electrical quantities respectively corresponding to the capacitances of said first and second detection capacitors, and said resultant electrical quantity being the sum of said first and second electrical quantities corresponding to a total capacitance of said first and second detection capacitors, wherein the mobile portion comprises a first mobile mass of semiconductor material, and mobile electrodes carried by said first mobile mass, said first mobile mass being fixed to first anchorages, fixed to a support, by first elastic elements configured to enable a displacement of said first mobile mass along said first and second directions of detection in response to said first and second components of acceleration, and wherein said fixed portion comprises first fixed electrodes, each of the fixed electrodes facing a respective one of said mobile electrodes and forming with said mobile electrodes said first and second detection capacitors, and said electrical-interconnection portion comprises first electrical interconnections electrically connecting said first fixed electrodes to one another, wherein said first fixed electrodes are U-shaped and comprise:

a first arm and a second arm facing opposite sides of a respective one of said mobile electrodes; and a connecting portion connecting said first and second arms to one another wherein said mobile electrodes extend outwards starting from said first mobile mass and aligned with one of said first and second directions of detection, said first and second arms respectively forming with said mobile electrodes first and second elementary capacitors coupled in parallel, which contribute to the formation of one of said first and second detection capacitors, according to the direction of alignment of said respective mobile electrodes.

23. The inertial sensor according to claim 22 wherein a displacement of said first mobile mass causes an increase in capacitance of the first elementary capacitor and a decrease in capacitance of the second elementary capacitor, said increase being higher than said decrease such that one of said first and second detection capacitors has a net increase of capacitance following said displacement, regardless of the direction of said first and second components of acceleration.

* * * * *

UNITED STATES PATENT AND TRADEMARK OFFICE
CERTIFICATE OF CORRECTION

| | | |
|---|---|---|
| PATENT NO. | : 7,793,544 B2 | Page 1 of 1 |
| APPLICATION NO. | : 11/777702 | |
| DATED | : September 14, 2010 | |
| INVENTOR(S) | : Angelo Merassi et al. | |

It is certified that error appears in the above-identified patent and that said Letters Patent is hereby corrected as shown below:

Column 9
Claim 1, Line 3, "inertial sensor, given by a vector sum of said in plane" should read as
--inertial sensor, given by a vector sum of said in-plane--.

Column 10
Claim 8, Line 13, "being made of conductive material, and electrically coupled" should read as
--being made of conductive material and electrically coupled--.

Signed and Sealed this
Twenty-eighth Day of December, 2010

David J. Kappos
*Director of the United States Patent and Trademark Office*